US007013008B1

(12) United States Patent
Rachlin et al.

(10) Patent No.: US 7,013,008 B1
(45) Date of Patent: Mar. 14, 2006

(54) DEVICE AND METHOD FOR CONNECTING A MONITORED ALARM SYSTEM TO TELEPHONE LINES WITHIN A TELEPHONE NETWORK INTERFACE

(76) Inventors: Steven J. Rachlin, 1118 Treeline Dr., Bensalem, PA (US) 19020; Brian E. Rachlin, 979 Sheffield La., Huntingdon Valley, PA (US) 19006

( * ) Notice: Subject to any disclaimer, the term of this patent is extended or adjusted under 35 U.S.C. 154(b) by 0 days.

(21) Appl. No.: 09/346,520

(22) Filed: Jul. 2, 1999

(51) Int. Cl.
*H04M 1/00* (2006.01)
(52) U.S. Cl. .................................. 379/413.04; 379/438
(58) Field of Classification Search ................ 379/438, 379/399, 413.04, 413.02, 413.03; 439/502, 439/623, 624, 638, 639
See application file for complete search history.

(56) References Cited

U.S. PATENT DOCUMENTS 4,932,051 A * 6/1990 Karan et al. ................. 379/399
5,971,799 A * 10/1999 Swade ......................... 439/502
6,106,328 A * 8/2000 O'Neal ......................... 439/623

* cited by examiner

*Primary Examiner*—Jack Chiang
(74) *Attorney, Agent, or Firm*—LaMorte & Associates

(57) ABSTRACT

A device and method for interconnecting the wires of a monitored alarm system into a telephone network interface without disturbing preexisting telephone line connections. The device is a connector assembly that is adapted to engage one of the connector modules present in a telephone network interface. The connector assembly electrically interconnects to a telecommunications pathway that passes through the telephone network interface. The connector assembly contains a wire connector that receives wires from the monitored alarm system. By connecting the alarm system wires to the connector assembly and connecting the connector assembly to the telephone network interface, the monitored alarm system is connected to external telephone lines without requiring existing telephone wire connections to be compromised.

4 Claims, 5 Drawing Sheets

DEVICE AND METHOD FOR CONNECTING A MONITORED ALARM SYSTEM TO TELEPHONE LINES WITHIN A TELEPHONE NETWORK INTERFACE

BACKGROUND OF THE INVENTION

1. Field of the Invention

In general, the present invention relates to devices that are used to interconnect wires within the confines of a telephone network interface. More particularly, the present invention relates to devices that facilitate the interconnection of wires from a monitored alarm system with telephone wires within a telephone network interface.

2. Description of the Prior Art

When telephone wires enter a private home or a small commercial building, the wires typically terminate in a telephone network interface. The telephone network interface is typically a small waterproof junction box that is mounted to the exterior of the home or building. Telephone wires from within the facility also terminate within the telephone network interface. Within the telephone network interface, the telephone wires from within the facility are interconnected to the incoming telephone wires from the telecommunications provider. Common telephone network interfaces are exemplified by U.S. Pat. No. 4,945,559 to Collins, entitled Telephone Network Interface Apparatus, and U.S. Pat. No. 5,901,220 to Garver, entitled, Network Interface Device.

Typically, the telephone network interface also represents the line of demarcation between property that is owned by the telecommunications provider and property that is owned by the customer facility. If a telephone wire needs repair at any point prior to the telephone network interface, the repair is the responsibility of the telecommunications provider. However, if a telephone wire needs repair at any point after the telephone network interface, the repair is typically the responsibility of the customer facility.

Many businesses and private homes have remotely monitored security systems and/or medical alert systems. In such systems, an alarm signal is sent to a remote monitoring station when the system is triggered. Most commonly, such systems send alarm signals to the remote monitoring station using the telephone lines within the monitored facility. In order to connect a security system or a medical alert system to a facility's telephone lines, wires from the system must be interconnected with the telephone wiring of the monitored facility. The most common place used to interconnect wires from a monitored alarm system to a facility's telephone lines is within the telephone network interface.

When a monitored alarm system is added to a facility, that alarm system must be able to send an alarm signal to a monitoring center regardless to the status of the telephones within that facility. For instance, if a person is talking on the telephone or if the telephone is off-the-hook when an alarm signal needs to be sent, the monitored alarm system must have the ability to close the open telephone line and reestablish a dialing tone so that the alarm signal can be successfully transmitted. In the field of monitored alarm systems, this is commonly accomplished by placing the monitored alarm system in series with the customer telephones, in between the customer's telephones and the telephone network interface.

Referring to FIG. 1, a schematic of a prior art monitored alarm system installation is shown. Within the telephone network interface 10 for a facility, a pair of external wires 20 is received from the telephone pole for each telephone exchange used within that facility. If a facility uses multiple exchange numbers, multiple pairs of external wires 20 are received.

Within the telephone network interface 10 are provided a set of wire mounting screws 28 for each telephone exchange, wherein the wire mounting screws 28 are interconnected with the incoming external wires 20 for that exchange. If no monitored alarm system were present, wires 34 from within the facility would be connected to the wire mounting screws 34 within the telephone network interface 10, thereby completing the interconnection between the facility's telephones and the external telephone lines 20 of the telecommunications provider.

When a monitored alarm system is installed in a facility, a four wire cable 17 is typically run into the telephone network interface 10. The wires 34 that lead to the facility's telephones are disconnected from the wire mounting screws 28 and are attached to two of the wires in the four wire cable 17. The wire-to-wire interconnection 15 is commonly made using mechanical crimps, or taped wire twisting. The other two wires of the four cable wire 17 are connected to the wire mounting screws 28 in place of the facility's telephone wires 34. Accordingly, in order for a telephone to be interconnected with an external telephone line 20, signals between the external telephone lines 20 and the facility's internal telephone wires 34 must pass through the monitored alarm system. Such an installation enables the monitored alarm system to disconnect any open telephone line, reestablish a dial tone and transmit an alarm signal to a remote monitoring station.

Since the wire-to-wire interconnection 15 of the facilities telephone wires 34 and the four wire cable 17 are made using mechanical crimps, it is not uncommon for wire connections to fail or short within the telephone network interface. Once a wire connection fails or shorts, a facility's telephone service may become compromised. The facility owner then typically calls the telephone company for service. When, a telephone company serviceman checks the telephone network interface, he/she often perceives the alarm wires as having caused the problem. The telephone serviceman therefore often disconnects the alarm wires and directly reconnects the telephone wires. The facility owner must then call the alarm company for service to reconnect the alarm wires.

A need therefore exists for a better way to integrate alarm wires into a telephone network interface so that the quality of connections between telephone wires and monitored alarm system wires is improved. This need is met by the present invention as is described and claimed below.

SUMMARY OF THE INVENTION

The present invention is a device and method for interconnecting the wires of a monitored alarm system into a telephone network interface without disturbing preexisting telephone line connections. The device is a connector assembly that is adapted to engage one of the connector modules present in a telephone network interface. The connector assembly electrically intersects at least one telecommunications pathway that passes through the telephone network interface. The connector assembly contains a wire connector that receives wires from the monitored alarm system. By connecting the alarm system wires to the connector assembly and connecting the connector assembly to the telephone network interface, the monitored alarm system is connected to external telephone lines without requiring existing telephone wire connections to be compromised.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention device and method can be used to interconnect many different system wires within a telephone network interface, the present invention device is particularly well suited for interconnecting monitored alarm system wires to external telephone lines within the telephone network interface. Accordingly, the illustrated examples of the present invention device will show applications where it is being used to interconnect monitored alarm system wires to telephone wires within a telephone network interface.

Figure 2:
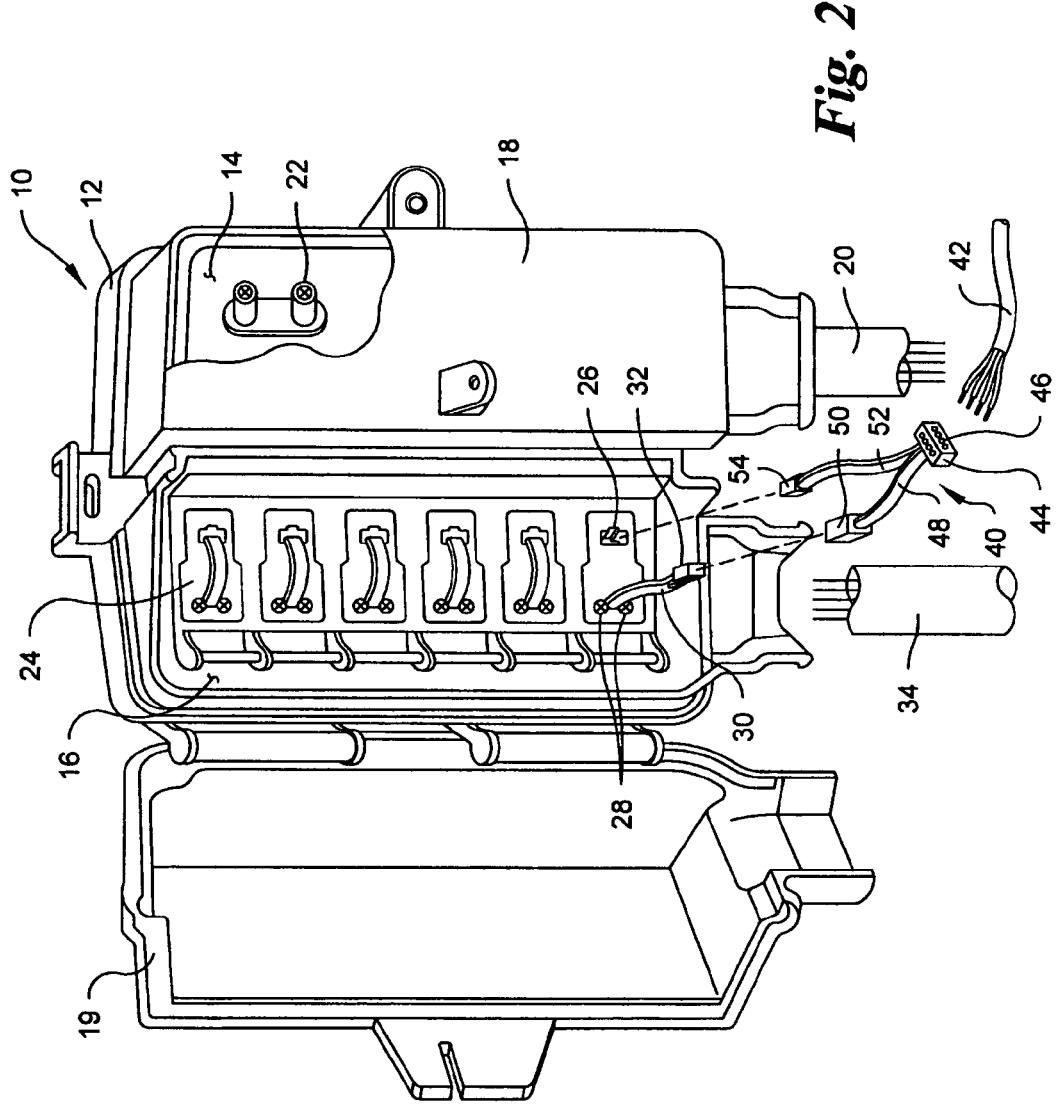
FIG. 2 is a perspective view of an exemplary embodiment of the present invention device shown in conjunction with a telephone network interface and wires from a monitored alarm system.

Referring to FIG. 2, an exemplary telephone network interface 10 is illustrated. The telephone network interface 10 contains a plastic housing 12 that mounts to the exterior of a home or business. Within the housing 12 are two separate chambers 14, 16 that are accessible with two swinging doors 18, 19. External telephone wires 20 from the telecommunications provider enter the first chamber 14, wherein they are coupled to mounting connectors 22. The mounting connectors 22 are set in pairs so as to receive matched pairs of telephone wires from the telecommunications provider.

In the second chamber 16 of the telephone network interface 10 are located a plurality of connection modules 24. Each of the connection modules 24 contains a female connector port 26 and a pair of wire mounting screws 28. The number of connection modules 24 corresponds to the number of mounting connectors 22 in the second chamber 14 of the telephone network interface 10. Within the housing 12 of the telephone network interface 10, the female connector ports 26 in the connection modules 24 are electrically interconnected to the mounting connectors 22 in the second chamber 14.

A patch cord 30 is attached to each of the connection modules 24. The patch cord 30 contains wires. At one end of the patch cord 30, the wires of the patch cord are electrically connected to the wire mounting screws 28. The opposite end of the patch cord 30 is terminated with a modular connector 32 such as a model RJ-11 modular telephone connector. The modular connector 32 is sized to engage the female connector port 26 on the connection module 24.

Telephone wires 34 from the facility are directed into the housing 12 of the telephone network interface 10. A pair of wires is provided for each telephone exchange provided for that facility. Each wire pair is attached to the wire mounting screws 28 of a connector module 24. When the modular connector 32 on the patch cord 30 is inserted into the female connector port 26, a connection is made between the internal telephone wires 34 of the facility and the external telephone wires 20 of the telecommunications provider.

A connector assembly 40 is provided to interconnect alarm system wires 42 with the external telephone wires 42 without disrupting the connection of internal telephone lines in the telephone network interface 10. The connector assembly 40 contains a wire receptacle connector 44. The wire receptacle connector 44 contains four ports 46 that receive the four wires from a typical monitored alarm system. The wire receptacle connector 44 positively engages the monitored alarm system wires 42 using a crimp, clamp, mounting screws, or the like. In the shown embodiment, set screws are present in the wire receptacle connector 44 to positively engage the monitored alarm system wires 42.

Two cable leads extend into the wire receptacle connector 44. The first cable lead 48 terminates with a female connector port 50. The female connector port 50 is adapted to receive the modular connector 32 at the end of a patch cord 30 on one of the connector modules 24 in the telephone network interface 10. The second cable lead 52 terminates with a male modular connector 54. The male modular connector 54 is adapted to engage the female connector port 26 on one of the connector modules 24 in the telephone network interface 10.

Figure 3:
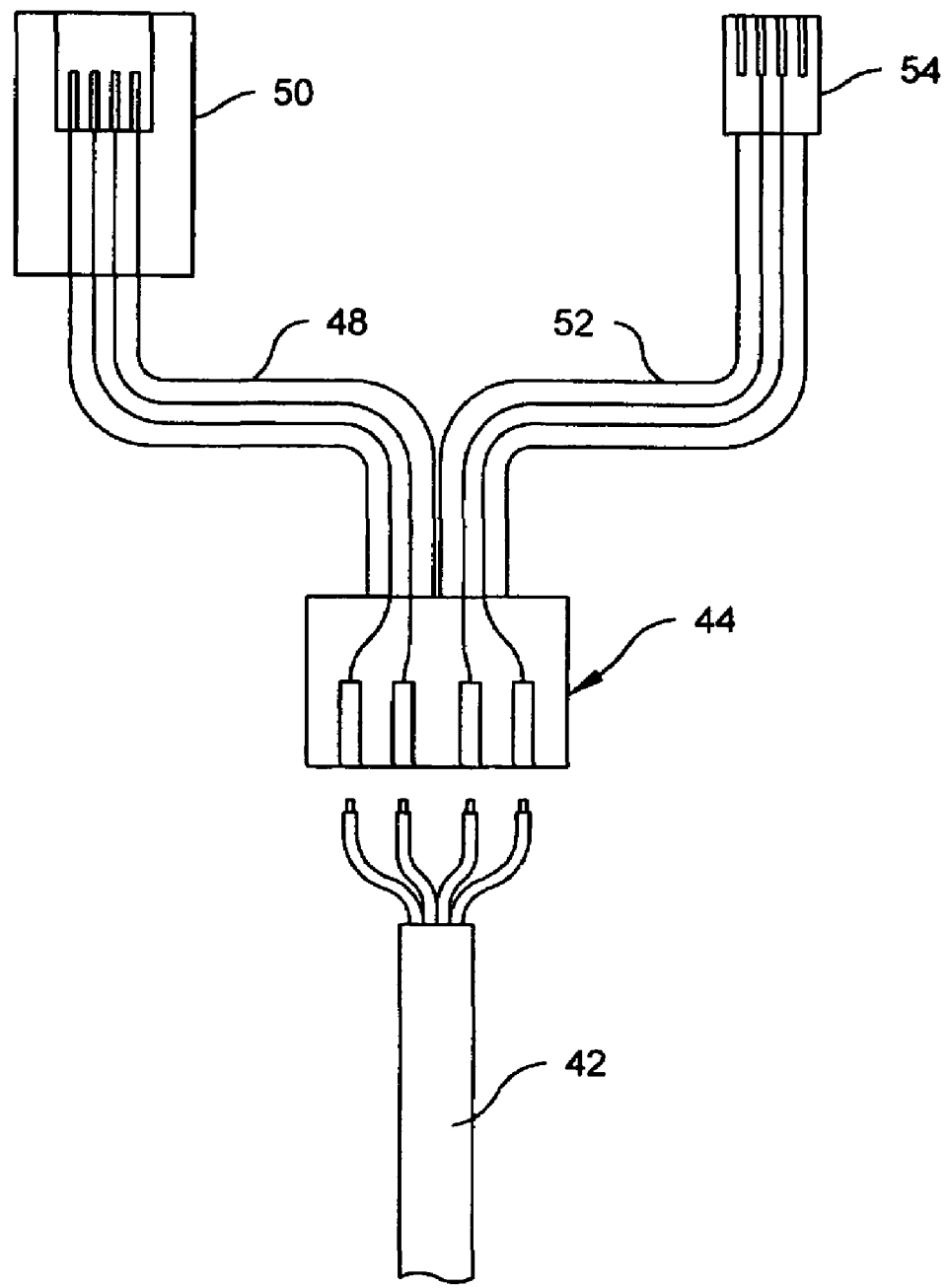
FIG. 3 is schematic of the embodiment of the connector assembly shown in FIG. 2.

Referring to FIG. 3, it can be seen that the two wires contained within the first cable lead 48 and the two wires contained within the second cable lead 52 all lead to separate ports of the wire receptacle connector 44. The wire receptacle connector 44 acts as a junction, wherein an electrical interconnection between with the female connector port 50 and the male modular connector 54 can be had through the monitored alarm system. Accordingly, by connecting the monitored alarm system wires 42 to the wire receptacle connector 44, the monitored alarm system wires 42 are interconnected with both the female connector port 50 and the male modular connector 54 without disturbing any other wire interconnection that is present within the telephone network interface.

Returning to FIG. 2, it can be seen that modular connector 32 of the patch cord 30 interconnects with the female connector port 50 of the connector assembly 40. Similarly, the male modular connector 54 of the connector assembly 40 engages the female connector 26 of the same connector module 24. The telephone wires connected at the wire mounting screws 28 remain undisturbed. However, the connector assembly 40 enables the monitored alarm system wires to be introduced in series into the electrical pathways between the internal telephone wires 34 and the external telephone wires 20. The monitored alarm system wires 42 are therefore interconnected to the external telephone wires in a manner that enables the monitored alarm system to disable any of the internal telephone wires 34.

Figure 4:
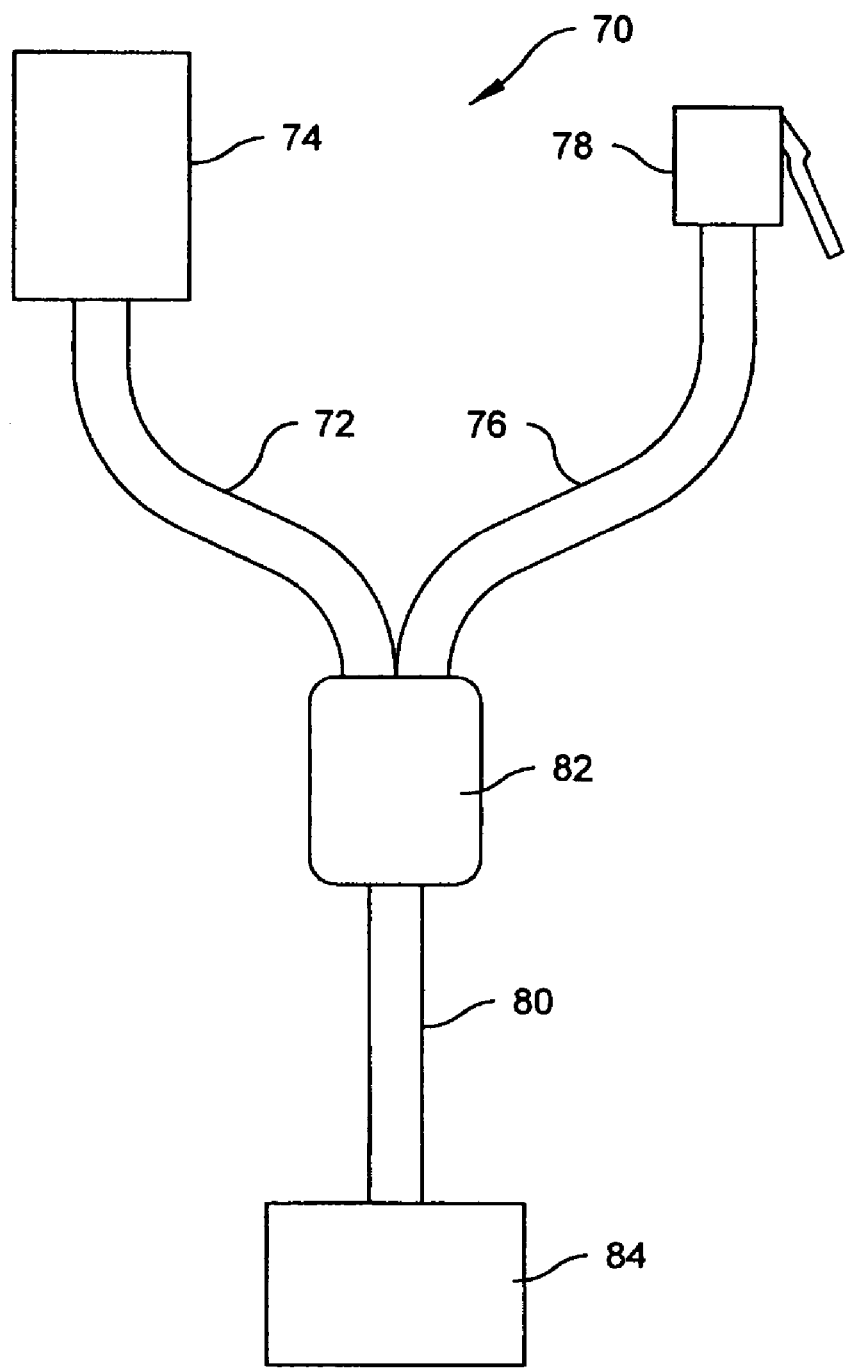
FIG. 4 is front view of an alternate embodiment of connector assembly in accordance with the present invention.

Referring to FIG. 4, an alternate embodiment of the connector assembly 70 is shown. In this embodiment, the first cable lead 72 from the female connector port 74 and the second cable lead 76 from the male modular connector 78 join together with a third cable lead 80 at a splice junction 82. The third cable lead 80 extends to the wire receptacle connector 84.

Figure 5:
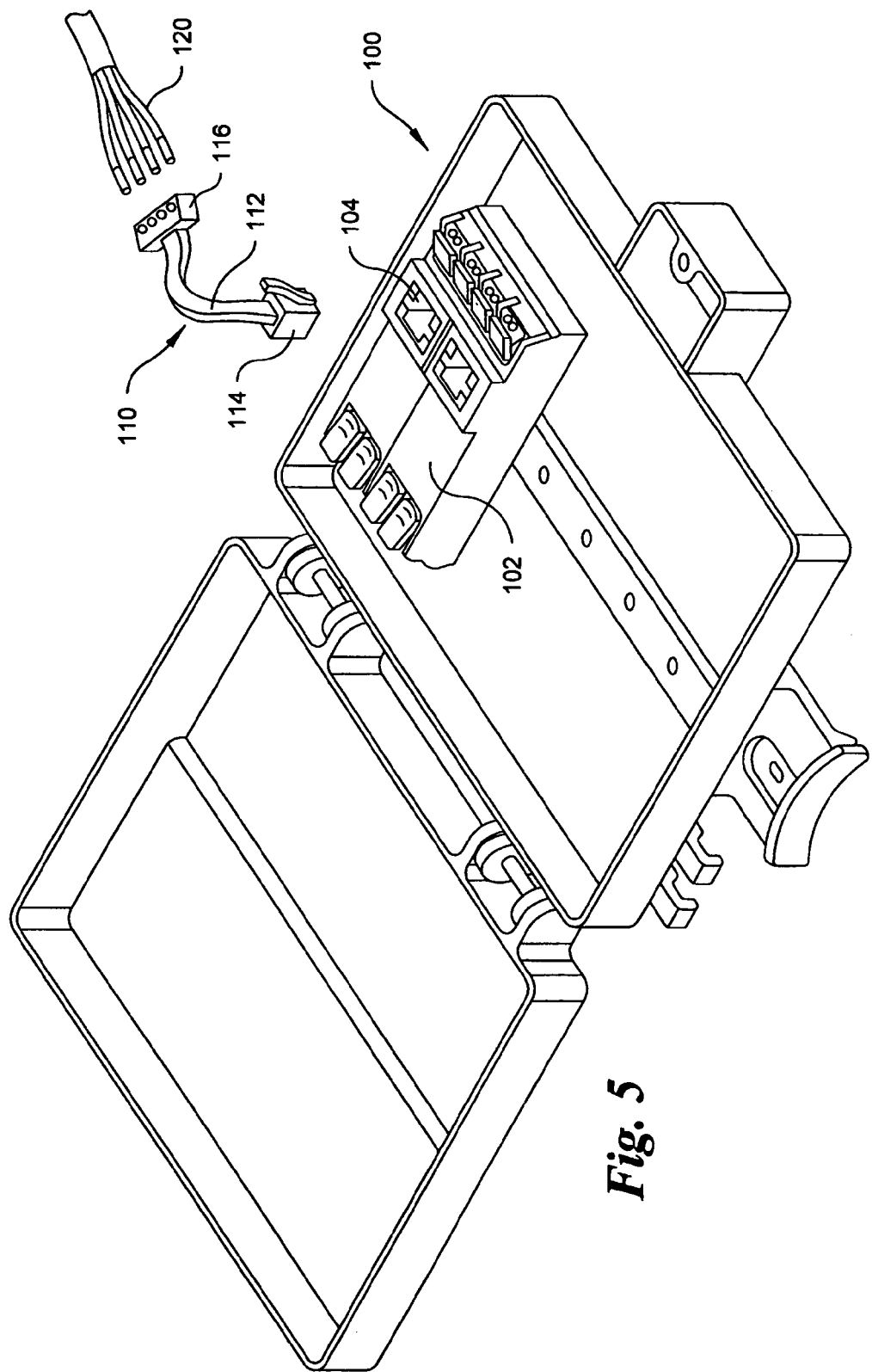
FIG. 5 is a perspective view of an alternate embodiment of the present invention device shown in conjunction with a telephone network interface and wires from a monitored alarm system.

Referring to FIG. 5, an alternate embodiment of a telephone network interface 100 is shown. In this embodiment, connector modules 102 are also used to interconnect internal customer-owned telephone wires (not shown) with external provider-owned telephone wires (not shown). However, in this model of telephone network interface 100, no patch cords are used on the connector modules. Rather, interconnection are hard wired within the structure of the connector modules 102. Accordingly, there is no means to directly interconnect the connection assembly of FIG. 2, FIG. 3 and FIG. 4 to the telephone network interface.

The telephone network interface 100 shown in FIG. 5 does have connector modules 102. On each of the connector modules 102 is a test port 104. The test port 104 provides a means for a technician to directly access the telephone lines at the point of the telephone network interface 100. The leads contained within the test port are internally interconnected to the telephone lines.

Figure 1:
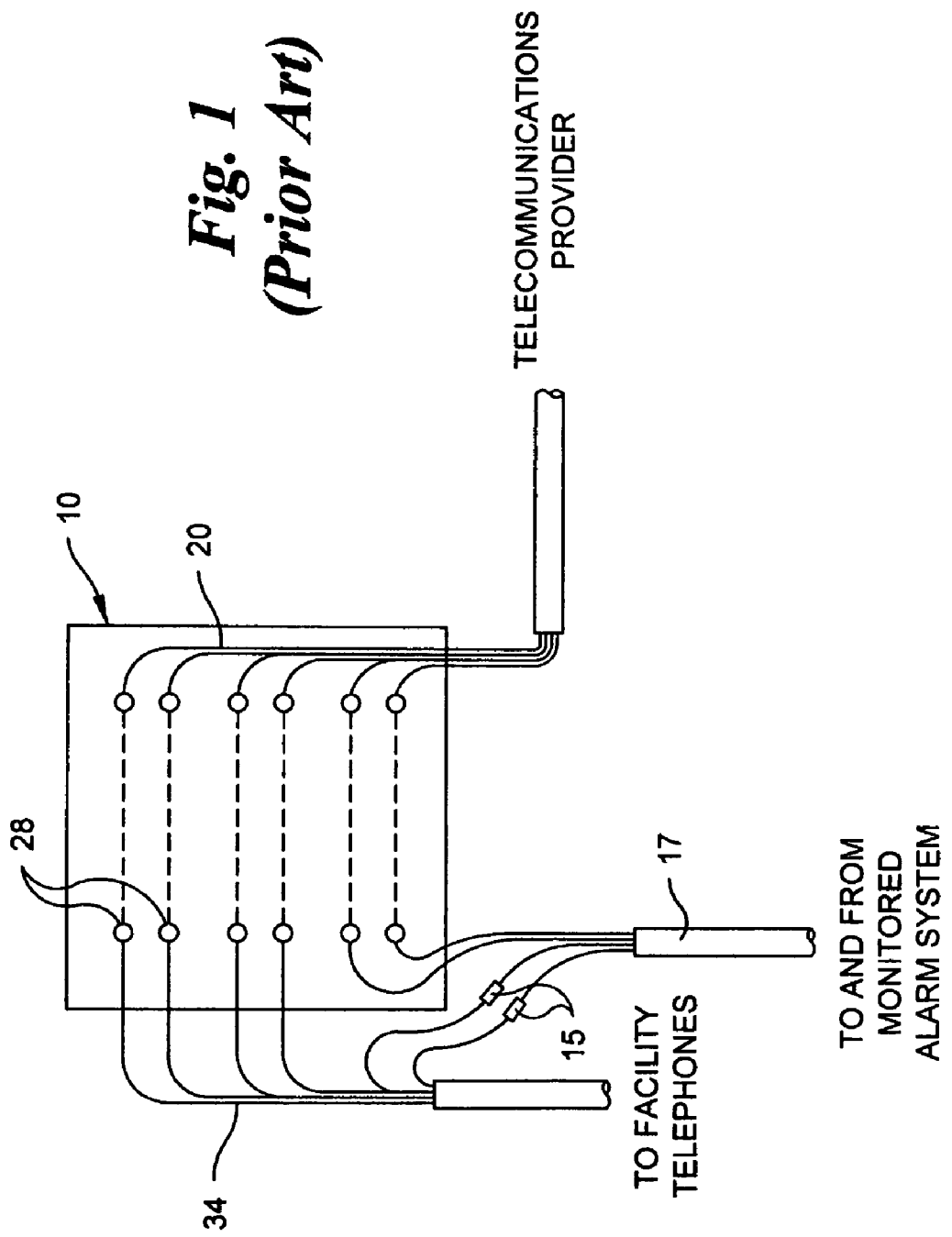
FIG. 1 is a schematic of a prior art installation of a monitored alarm system.

An alternate embodiment of a connector assembly 110 is also shown. In this embodiment, the connector assembly 110 contains only one cable lead 112. One end of the cable lead 112 is terminated in a male modular plug 114 that can engage the test port 104 on any of the connector modules 102. The opposite end of the cable lead 112 is terminated in a wire receptacle connector 116, such as previously described in regard to FIG. 1.

To install the connector assembly 102, the monitored alarm system wires 120 are connected to the wire receptacle connector 116. The male modular connector 114 is then inserted into the test port 104 on one of the modular connectors 102. Once the male modular connector 114 is inserted into a test port 104, the connector assembly 102 becomes electrically interconnected to the internal telephone wires and the external telephone wires that lead to that modular connector. The monitored alarm system wires 120 are therefore interconnected to the external telephone wires without disturbing the interconnection between the internal telephone wires and the external telephone wires.

It will be understood that the embodiments of the present invention device and method described and illustrated herein are merely exemplary and a person skilled in the art can make many variations to the embodiment shown without departing from the scope of the present invention. Elements from different embodiments can be mixed in manners not specifically described. All such variations, modifications and alternate embodiments are intended to be included within the scope of the present invention as defined by the appended claims.

What is claimed is:

1. In a telephone network interface wherein internal telephone lines are interconnected to external telephone lines along at least one connection path and wherein each connection path contains a patch cord terminated with a first male connector that removably engages a first female connector, a method of electrically interconnecting unterminated alarm system wires to the connection path so that an automated alarm system can utilize the external telephone wires when the automated alarm system is activated, said method comprising the steps of:

providing a connector cable assembly, wherein said connector cable assembly has three terminations that include a male modular connector, a female connector port and a wire receptacle connector, wherein said male modular connector is sized to fit within said first female connector, said female connector port is sized to receive said first male connector and said wire receptacle receives and engages said unterminated alarm system wires, and wherein said male modular connector and said female connector port are both electrically interconnected to each other and to said wire receptacle connector by cable wires;

disconnecting said first male connector of said patch cord from said first female connector in the telephone network interface;

connecting said male modular connector on said connector cable assembly to said first female connector in the telephone network interface;

connecting said first male connector on said patch cord to said female connector port on said connector cable assembly, therein connecting said connector cable assembly between said patch cord and said first female connector in the telephone network interface; and connecting said unterminated alarm system wires to said wire receptacle connector on said connector cable assembly, therein electrically interconnecting said alarm system wires to said patch cord.

2. The method according to claim 1, wherein said step of connecting said unterminated alarm system wires to said wire receptacle connector, includes inserting the unterminated alarm system wires into said wire receptacle connector and locking each of the unterminated alarm system wires into place within said wire receptacle connector with a mechanical fastener.

3. In a telephone network interface wherein internal telephone lines within a building are interconnected to external telephone lines along at least one connection path and wherein each connection path contains a female connector port that interconnects with that connection path, a method of electrically interconnecting unterminated alarm system wires to the connection path, comprising the steps of:

providing a connector cable assembly, wherein said connector cable assembly is terminated at opposite ends with a male modular connector, that is sized to engage the female connector port, and a wire receptacle connector that can receive and engage unterminated wires;

connecting the unterminated alarm system wires to said wire receptacle connector; and connecting said male modular connector to the connector port, wherein said connector cable assembly electrically interconnects said unterminated alarm system wires to said connection path through said female connection port.

4. The method according to claim 3, wherein said step of connecting the unterminated alarm system wires to said wire receptacle connector, includes inserting the unterminated alarm system wires into said wire receptacle connector and locking each of the unterminated alarm system wires into place within said wire receptacle connector with a mechanical fastener.

* * * * *